United States Patent [19]
Lutzer

[11] Patent Number: 5,967,254
[45] Date of Patent: Oct. 19, 1999

[54] ENERGY DISSIPATING EMERGENCY EVACUATION SLIDE

[75] Inventor: Wilhelm Lutzer, Hamburg, Germany

[73] Assignee: DaimlerChrysler Aerospace Airbus GmbH, Hamburg, Germany

[21] Appl. No.: 09/012,681

[22] Filed: Jan. 23, 1998

[30] Foreign Application Priority Data

Jan. 24, 1997 [DE] Germany .......................... 197 02 428

[51] Int. Cl.$^6$ .................................................. A62B 1/20
[52] U.S. Cl. ................................ 182/48; 182/49; 182/70; 182/74; 193/25 B; 244/137.1
[58] Field of Search ................................. 182/48, 49, 70, 182/74; 193/25 B, 25 C; 244/137.1, 137.2, 137.3, 137.4, DIG. 2

[56] References Cited

U.S. PATENT DOCUMENTS

| | | | |
|---|---|---|---|
| 3,092,232 | 6/1963 | Adams, Jr. .............................. | 182/48 X |
| 3,656,579 | 4/1972 | Fisher et al. ............................... | 182/48 |
| 3,994,366 | 11/1976 | Okuma et al. ............................ | 182/48 |
| 4,018,321 | 4/1977 | Fisher ..................................... | 182/48 X |
| 4,246,980 | 1/1981 | Miller ........................................ | 182/48 |
| 4,378,861 | 4/1983 | Burrough et al. ........................ | 182/48 |
| 4,434,870 | 3/1984 | Fisher ........................................ | 182/48 |
| 4,605,095 | 8/1986 | Koizumi ................................... | 182/48 |

Primary Examiner—Daniel P. Stodola
Assistant Examiner—Bruce A. Lev
Attorney, Agent, or Firm—W. F. Fasse; W. G. Fasse

[57] ABSTRACT

An emergency evacuation slide has an internal energy dissipation characteristic so that the slide is especially suitable for evacuation of persons from a relatively great height. By dissipating the energy internally in the slide rather than by frictional heating of the clothing and skin of the evacuating persons, the danger of skin burns and other injuries to the persons is reduced or avoided. The slide surface of the slide is made up of a plurality of slide modules that each include an elastically elongatable segment, an interconnecting segment, and an anti-slip segment, which are respectively connected together one after another. The anti-slip segment has an upper anti-slip surface with a high coefficient of friction so that the anti-slip segment remains in static frictional contact and moves along with the evacuating person. The bottom surface of the anti-slip segment has a predefined coefficient of friction. The upstream end of the elongatable segment and the downstream end of the anti-slip segment are connected mechanically to a slide support body. As a person slides down the slide, the anti-slip segment moves downward along with the person and the downstream end thereof curls or rolls under itself, while the elongatable segment stretches elastically. Energy is dissipated by internal friction within the elastic elongatable segment and by friction of the bottom surface of the anti-slip segment curling or rolling under itself.

24 Claims, 3 Drawing Sheets

ENERGY DISSIPATING EMERGENCY EVACUATION SLIDE

FIELD OF THE INVENTION

The invention relates to an emergency evacuation slide especially for spanning relatively great height differences between a location to be evacuated and a safe location, for example between an aircraft exit and the ground, whereby the emergency slide includes a sliding surface that extends down to the ground from the aircraft at an angle determined by the particular situation.

BACKGROUND INFORMATION

In conventional emergency evacuation slides, such as inflatable slides deployed from aircraft for an emergency evacuation, it is generally known that the energy released while a person slides down the slide is dissipated, i.e. converted to heat, by the friction between the clothing or skin of the person and the sliding surface of the emergency slide. Namely, the gravitational potential energy of a person sliding from a higher level to a lower level is converted to kinetic energy, and is then ultimately converted to and dissipated as heat due to the frictional contact of the person on the sliding surface. As a result, the sliding surface and the clothing and skin of the evacuating persons can become quite hot, whereby the degree of heating is ultimately dependent on the height difference that is spanned by the emergency slide. Also, sufficient friction must be provided so that the evacuating persons are discharged from the bottom end of the slide at acceptably low speeds for avoiding injuries.

It has been found in practice that the temperature levels reached during the use of conventional slides for single-deck aircraft are just barely within an acceptable range. However, in the next generation of high capacity aircraft and especially multi-deck aircraft, it will be necessary to provide emergency slides that can safely span substantially greater height differences between the upper deck of the aircraft and the ground. First of all, the emergency slides must be made substantially longer to span the greater height differences while still maintaining a slide angle within an acceptable range. More importantly, if the conventional slides with conventional sliding surfaces are simply made longer, then the thermally dissipated energy would heat the clothing and skin of the evacuated persons to such a high temperature that the persons could suffer burns.

Evacuation slides are also known, having deceleration means such as bumps, ridges, grooves or a high friction surface treatment on the sliding surface, for example as disclosed in U.S. Pat. No. 4,246,980 (Miller). Such slide surfaces dissipate the kinetic energy of the evacuating persons by frictional heating resulting from frictional sliding, as well as through the impact between the evacuating person and the ridges or ripples provided for the deceleration. If such slides are used for a greater height difference with a greater associated energy to be dissipated, the impact rubbing of the body of the evacuating person against the ridged surface can result in bruising as well as frictional skin burns to the person.

SUMMARY OF THE INVENTION

In view of the above, it is an object of the invention to provide an emergency evacuation slide with an energy dissipating characteristic, especially for safely spanning relatively great height differences, whereby the energy to be dissipated during the sliding process is no longer predominantly dissipated through the frictional rubbing between the clothing and skin of the sliding person and the sliding surface of the slide. It is a further object of the invention to provide an emergency evacuation slide with internal energy dissipation means within the slide. The invention further aims to avoid or overcome the other disadvantages of the prior art, and to achieve additional advantages as apparent from the present description.

The above objects have been achieved in an emergency evacuation slide according to the invention comprising a support and a sliding surface arranged on the support, wherein the sliding surface comprises at least one, but preferably a plurality of slide modules. Each slide module comprises at least two material web sections arranged and connected one after another in the sliding direction. A first web segment includes an elastic stretchable or elongatable segment, while a second web segment includes a sliding segment having a relatively low frictional sliding surface, and a gripping or anti-slip segment having a relatively high frictional anti-slip surface thereon. The sliding segment acts as an interconnecting segment between the elastic elongatable segment and the anti-slip segment. The upstream end of the elastically stretchable or elongatable segment and the downstream end of each anti-slip segment of each slide module are mechanically secured onto the slide surface or the slide support. The bottom surface of the anti-slip segment has a specified or predefined frictional coefficient. The slide preferably further includes a protective cover layer having a relatively low coefficient of friction allowing sliding thereon arranged to cover over at least the elastically elongatable segment and preferably additionally the sliding segment.

When an evacuating passenger or other person uses the slide, the person first slides on the upper cover layer of the first slide module, until he or she reaches the anti-slip segment of the first slide module. The anti-slip segment has a high enough coefficient of friction on its upper surface so that the person does not slide substantially relative to the anti-slip segment, but instead the anti-slip segment is pulled down so as to move along with the motion of the person, whereby the elastically elongatable segment is correspondingly stretched while taking up energy. Simultaneously, the anti-slip segment rolls or curls under itself since its downstream edge is secured to the slide. As the anti-slip segment rolls or curls under itself, the bottom surface thereof rubs against itself with a predefined frictional coefficient, whereby energy is dissipated by frictional heating of the bottom of the anti-slip segment.

The respective anti-slip segment rolls or curls under itself until the entire anti-slip segment is curled under or until the passenger reaches the anti-slip segment of the next successive slide module, whereupon the energy dissipation process is repeated on the next anti-slip segment. Meanwhile, the anti-slip segment of the first slide module springs back or returns to its initial position due to the elastic return contraction of the elastically elongatable segment of the first slide module. This retraction dissipates further energy both in the anti-slip segment, and in the elastically elongatable segment due to internal frictional losses (since the elongatable segment is not a perfectly elastic element).

The above objects of the invention have further been achieved in a method of evacuating persons on an emergency slide, comprising providing a movable slide member, causing the movable slide member to slide along with the evacuating person thereon relative to the rest of the slide, and dissipating energy in the slide due to the motion of the movable slide member. Particularly, the energy is dissipated due to frictional rubbing of the movable slide member curling or rolling back under itself, and due to internal frictional losses of an elastic member connected to the movable slide member.

By using the slide arrangement and slide method according to the invention, a considerable advantage is achieved in that the energy released while a person slides down the slide is dissipated by frictional rubbing of the underside of the anti-slip element and by internal friction within the elastically elongatable segment. Therefore, the clothing and skin of the passenger is not subjected to direct frictional heating, so as to help avoid skin burns or other injuries to the person.

BRIEF DESCRIPTION OF THE DRAWINGS

In order that the invention may be clearly understood, it will now be described, in connection with an example embodiment of the invention with reference to the drawings, wherein.

DETAILED DESCRIPTION OF PREFERRED EXAMPLE EMBODIMENTS AND OF THE BEST MODE OF THE INVENTION

Figure 1:
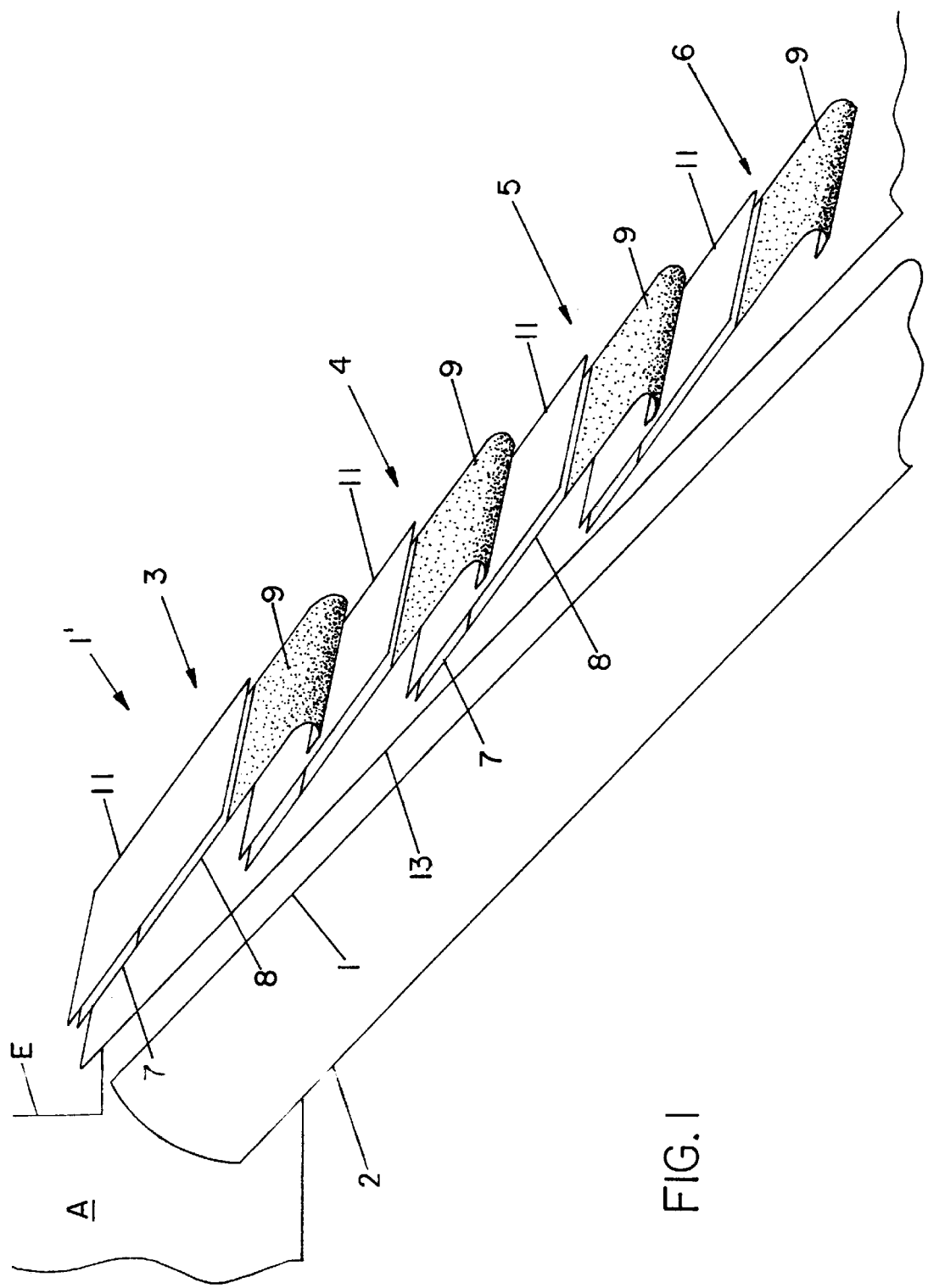
FIG. 1 is a schematic perspective view of an emergency slide according to the invention including four slide modules arranged on a slide support, connected to an emergency exit of an aircraft.

One or more slide modules according to the present invention can be arranged on the slide surfaces of existing or future emergency slides of any type in general, including inflatable or otherwise deployable emergency slides for evacuating aircraft or watercraft, or also on rigid slide frame structures or other slides for evacuating buildings or the like. FIG. 1 schematically represents one particularly advantageous and preferred arrangement of the present slide. As shown in FIG. 1, a slide 1' is connected to or deployed from an aircraft A at an emergency exit E thereof. The slide 1' includes a slide support comprising a gas-inflated support tube 2 of an inflatable emergency slide, and a plurality of slide modules 3, 4, 5 and 6 which are mechanically mounted and secured on the support tube 2. It should be understood that a single slide module could also be used, or a plurality of greater than four modules, e.g. 10 modules, could be used.

If the support tube 2 or other support member has an outer surface to which stitching or other direct mechanical connections can be applied, then the slide modules 3, 4, 5 and 6 may be mounted directly on the support. On the other hand, if a direct mechanical connection to the support cannot be made, then an intermediate layer 13 is provided, to which the slide modules 3, 4, 5 and 6 are securely mechanically attached by stitching, riveting, adhesive bonding, or any other known mechanical attachment means. The slide modules 3, 4, 5 and 6 are arranged successively one after another in a row in a shingle-like partially overlapping manner, namely such that the lower end of each respective slide module partially overlaps and covers the upper end of the next lower slide module. However, the illustrated shingle-like overlapping arrangement is not absolutely necessary, but instead a single module may be used, or a group of modules arranged side-by-side, or a plurality of modules arranged in a row without overlap could be used.

Figure 2:
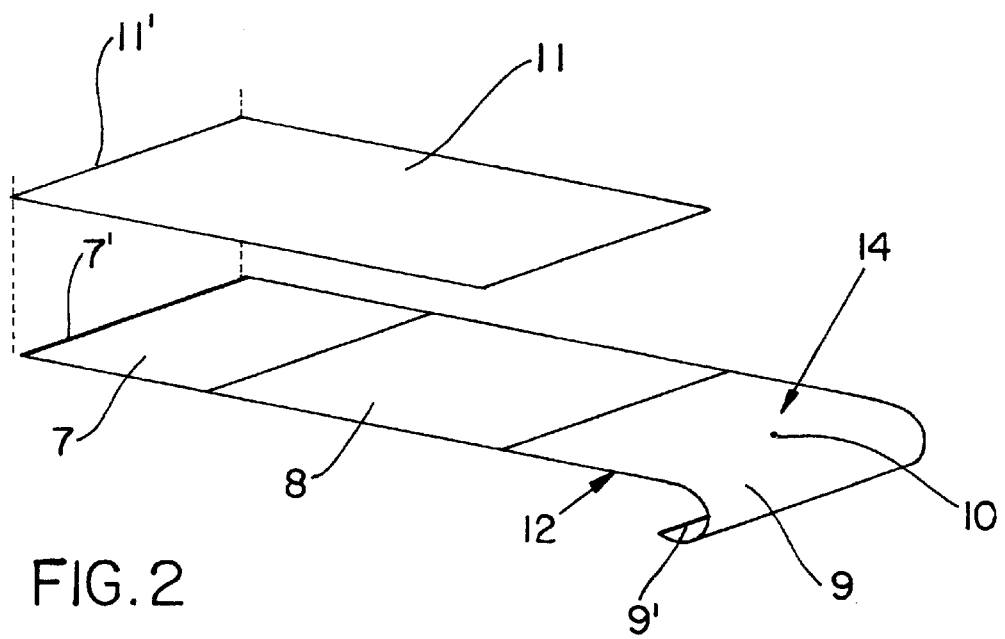
FIG. 2 is a schematic exploded view of the construction of a single slide module in an enlarged, but not-to-scale manner.

Each of the slide modules 3, 4, 5 and 6 is constructed as shown schematically in FIG. 2. Each slide module includes three material web sections or segments, that may each be made of appropriate woven or non-woven fabric webs, or of synthetic plastic films or sheets or the like, or any other material known for use in the construction of evacuation slides. The specific material selection for each segment can be made from all available and known materials depending on the particular characteristics required in any application. The three material web segments 7, 8 and 9 are arranged successively in a row in the sliding direction, and are connected together, for example by stitching, adhesive bonding, or thermal weld bonding, along the respective upstream and downstream edges of each segment.

The first upstream or uppermost web segment is an elastically stretchable or elongatable segment 7 consisting of a material that stretches elastically under load, but then returns to its original form upon release of the load. The stretchable material has an elastic characteristic that is not purely elastic, such that energy is dissipated by internal friction within the material when it is stretched and then returned to its original form. For example, the material for the elongatable segment 7 may include rubber fibers or strands extending in the lengthwise direction, or may comprise any other known stretchable synthetic fabric. The stretchable material preferably stretches to at least 150%, or more preferably 175% or even 200% of its original non-tensioned length.

The next segment connected to the bottom edge of the elongatable segment 7 is a sliding segment 8 made of a material that is very slippery, i.e. has as surface with a low coefficient of friction. This sliding segment 8 may comprise a fabric material, or a sheet or film of synthetic plastic material. This sliding segment 8 serves the purpose of separating the respective adjacent or neighboring layers from each other in a relatively non-frictional manner so that the layers do not have an influence on one another. The sliding segment 8 also serves as a force transmitting connection element between the elongatable segment 7 and the third or lowermost segment which is an anti-slip segment 9. For this purpose, the segment 8 should be substantially non-elongatable, i.e. having a substantially stable non-stretching length.

The anti-slip segment 9 has an upper anti-slip surface 14 with a relatively high coefficient of friction and a bottom frictional surface 12 having a predefined coefficient of friction, which are selected dependent upon the intended loads to be carried down the slide. For example, the upper anti-slip surface 14 of the anti-slip segment 9 has a coefficient of friction sufficiently high to prevent or substantially prevent a person from sliding relative to the anti-slip segment 9, i.e. such that the anti-slip segment 9 positively moves along with the person due to a static frictional contact between the person and the upper anti-slip surface 14. This surface coefficient of friction may be provided by the surface of the anti-slip segment 8 itself, or by an appropriate surface treatment, or by an anti-slip surface layer 10 having a high coefficient of friction provided thereon. The high coefficient of friction may be provided by relatively soft and "grippy" polymeric materials, or by a surface configuration including ripples, bumps, or ridges. As the segment 9 moves along with the person, it curls or rolls under itself so that the bottom frictional surface 12 frictionally rubs against itself as will be discussed farther below. Thus, the frictional coefficient of the bottom surface 12 is selected to provide the optimum energy dissipation and to still allow the segment 9 to move rather than becoming frictionally locked in place.

For frictional contact with a relatively soft countersurface such as the clothing of a person, the upper surface of the anti-slip segment 9 preferably has a coefficient of friction in the range from 0.4 to >1, and more preferably in the range from 0.8 to >1. On the other band, for frictional rubbing against itself as discussed below, the bottom surface 12 of the anti-slip segment 9 has a defined coefficient of friction in the range from 0.05 to 0.5, and more preferably in the range from 0.05 to 0.4.

The respective upstream edge 7' of the elongatable segment 7 and the respective downstream edge 9' of the anti-slip segment 9 of each slide module 3, 4, 5 and 6 are mechanically secured to the support tube 2 or the interlayer 13, as discussed above. Due to the present arrangement and sectoring of the components, the anti-slip segment 9 is adapted to roll or curl back underneath itself as it is pulled downward while stretching the elongatable segment 7. In order to further accommodate or facilitate such rolling or curling of the anti-slip segment 9, the rest of the elongatable segment 7, the sliding segment 8 and the anti-slip segment 9 are left unattached and free to move relative to the slide Support tube 2. Also, in a preferred arrangement, the Lower edge 9' of the segment 9 is curled back underneath the remainder of the segment 9 such that the upper or outer surface 14 of the segment 9 having the anti-slip layer 10 thereon is secured directly to the support tube 2 or the intermediate layer 13, already in the initial position of the arrangement.

Figure 3A:
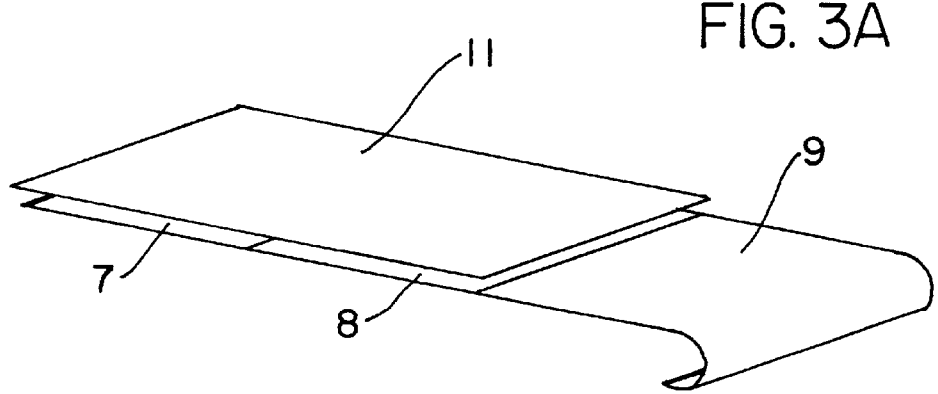
FIG. 3A is a schematic perspective view of a slide module in an initial or resting condition.
Figure 3B:
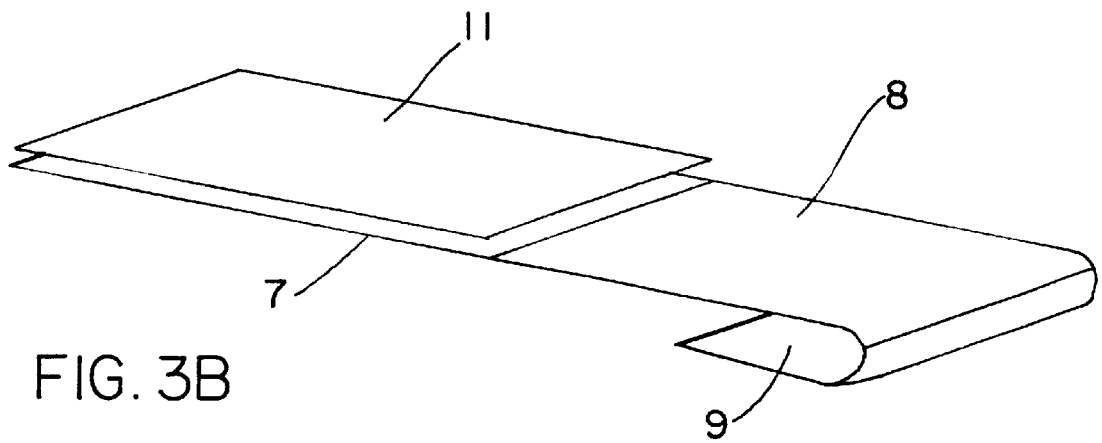
FIG. 3B is a schematic perspective view of a slide module in its completely extended final operating condition.

In order to separate two overlapping adjacent slide modules from each other in a non-frictional manner, a protective cover layer 11 comprising a relatively low friction or slidable material is arranged on top of and covering the elongatable segment 7 and preferably also the slide segment 8. Thus, as shown in FIG. 3A, the cover layer 11 of each slide module completely covers the elongatable segment 7 and the slide segment 8 of the respective module in an initial non-operating or rest condition. On the other hand, while the respective slide module is operating, with the elongatable segment 7 completely extended to the final end position, the cover layer 11 still covers and protects the elongatable segment 7, but the slide segment 8 is fully exposed.

As further shown in FIG. 1, each protective cover layer 11 may also serve for indirectly connecting the rollable or curlable anti-slip segments 9 to the support tube 2 or the intermediate layer 13. Namely, rather than being directly connected to the support tube 2 or the intermediate layer 3, the lower edge 9' of each anti-slip segment 9 may be connected to the top of the cover layer 11 of the next lower adjacent slide module. Especially, the lower edge 9' of each anti-slip segment 9 is first curled under itself so that the outer or upper surface 14 comprising the anti-slip layer 10 is mechanically secured to the top surface of the cover layer 11 of the next lower slide module. The upper edge 11' of each cover layer 11 is then secured along with the edge 7' of each elongatable segment 7 to the intermediate layer 13 or to the support tube 2.

When a person, such as an evacuating aircraft passenger, is sliding down the slide surface 1, the clothing of the person has direct contact with the upper surface 14 and particularly the anti-slip layer 10 of each anti-slip segment 9 of the successive slide modules 3, 4, 5 and 6. Due to the provision of an anti-slip frictional gripping layer 10 or other surface treatment with a sufficiently high static coefficient of friction, a static frictional contact and gripping between the person's clothing and the respective anti-slip segment 9 results, so that no energy is converted or dissipated as frictional heating at this interface between the person's clothing and the anti-slip segment 9. Instead, the respective anti-slip segment 9 is pulled downward to move along with the person due to the static frictional contact with the person's clothing, whereby the sliding segment 8 accordingly pulls down on and causes an elongation of the elastically elongatable segment 7. The elongatable segment 7 resists the elongation with an elastic return force and accordingly applies an elastic braking force through the sliding segment 8 to the anti-slip segment 9, so that the speed of movement of the anti-slip segment 9 and the person in static frictional contact therewith is diminished.

Meanwhile, due to the direct or indirect attachment of the anti-slip segment 9 onto the support tube 2, the anti-slip segment 9 progressively curls or rolls under itself, with the outer surface 14 of the segment 9 rolling out along the protective cover layer 11 of the next successive slide module. As a result, the remaining exposed surface area of the frictional anti-slip layer 10 or other anti-slip surface treatment of the anti-slip segment 9 becomes progressively smaller, until the person is released therefrom and slides over any remaining exposed portion of the cover layer 11 and onto the anti-slip segment 9 of the next successive slide module, e.g. slide module 4 following slide module 3.

At this time, once the person has left the first slide module 3, the tension of the elongated segment 7 pulls the segments 7, 8 and 9 of the first slide module 3 back into their initial positions in a relatively rapid snap-back fashion. Thus, the first module 3 is ready for transporting the next following person, as soon as the first person has been transported downward off the first module 3 onto the next module 4.

During the process of a person sliding down the slide, the gravitational potential energy of the person is converted to kinetic energy, which is then partially transferred to the elastic energy storage capacity of the elastically elongatable segment 7 as the anti-slip segment 9 rolls downward and the segment 7 is stretched. Some of the energy is dissipated through internal friction during the elastic stretching of the segment 7. Simultaneously, as the anti-slip segment 9 rolls or curls under itself, its bottom or inner surface 12 is caused to rub against itself, whereby its predefined coefficient of friction leads to a dissipation of some energy by frictional heating on the inner or bottom surface 12 of the anti-slip segment 9. Then, when the elongatable segment 7 snaps back or returns to its original condition, the energy stored in the elastic elongation thereof is partially dissipated by internal friction in the segment 7 and by friction of the segment 9. For any particular configuration of the present emergency slide, the elastic coefficient and dimensions of the elastically elongatable segment 7, as well as the frictional coefficients of the slide segment 8 and the anti-slip segment 9 (on its upper surface 14 and on its lower surface 12) are selected and achieved by appropriately selecting and dimensioning the materials used for making each of the respective segments. This selection and design can be carried out depending on the expected loads to be transported, the total height to be spanned, and the like.

Figure 4C:
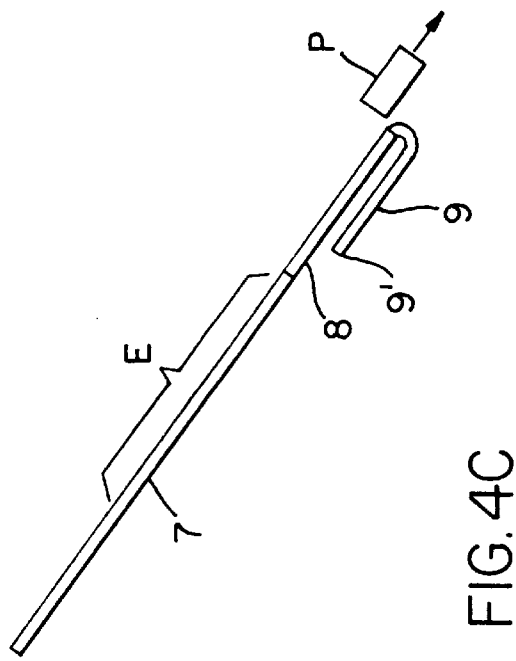
FIGS. 4A, 4B and 4C are schematic diagrams representing three successive stages in the operation of a slide module.
Figure 4B:
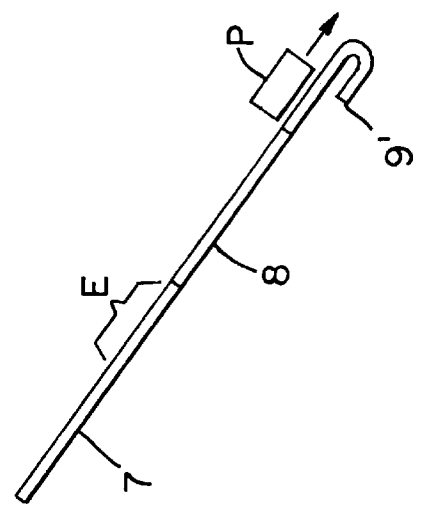
Figure 4A:
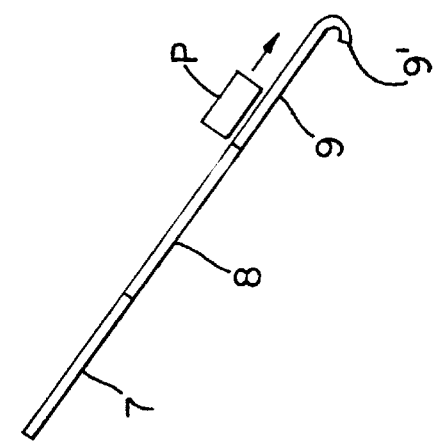

FIGS. 4A, 4B and 4C show successive stages during the operation of one of the slide modules as an example. In FIG. 4A, a load, such as a passenger P, has just come onto the anti-slip segment 9. In FIG. 4B, the anti-slip segment 9 has begun to roll or curl under itself while transporting the passenger P downward thereon in static frictional contact with the upper surface of the anti-slip segment 9. Simultaneously, the elongatable segment 7 is pulled and caused to stretch or elongate with an elongation E via the slide segment 8 that interconnects the anti-slip segment 9 and the elongatable segment 7. Thus, the elastic elongation E of the elongatable segment 7 takes up potential and/or kinetic energy from the passenger P, and thereby decelerates the passenger P. In FIG. 4C, the elongatable segment 7 has been fully extended, and the anti-slip segment 9 has been fully rolled or curled under itself, or rather under the slide segment 8 at this stage, and the passenger P is thus released from the anti-slip segment 9 of the illustrated slide module, but will for example immediately thereafter come onto the anti-slip segment 9 of the next successive slide module, whereupon the process repeats.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An emergency evacuation slide for a person to slide down from an upstream end of said slide at a higher elevation to a downstream end of said slide at a lower elevation, comprising a slide support member and at least one slide module arranged on said slide support member, wherein each said slide module comprises an elastically elongatable first web segment and a second web segment connected to a downstream end of said first web segment, said second web segment comprises an anti-slip upper surface area and a frictional lower surface area with a defined coefficient of friction, an upstream end of said first web segment is fixedly mechanically secured relative to said slide support member, a downstream end of said second web segment is fixedly mechanically secured relative to said slide support member, and a first remaining portion of said first web segment other than said upstream end of said first web segment and a second remaining portion of said second web segment other than said downstream end of said second web segment are not secured and are left loosely movable relative to said slide support member.

2. The emergency evacuation slide of claim 1, wherein said anti-slip upper surface area has a greater coefficient of friction as compared to said defined coefficient of friction of said frictional lower surface area.

3. The emergency evacuation slide of claim 1, wherein said anti-slip upper surface area has a coefficient of friction that is sufficiently high to be adapted to provide static frictional contact between said anti-slip upper surface area and a sliding person who slides down said slide so that said second web segment is caused to move together with the sliding person.

4. The emergency evacuation slide of claim 1, wherein said second web segment comprises a base layer and a frictional gripping layer arranged on said base layer, and said frictional gripping layer includes said anti-slip upper surface area.

5. The emergency evacuation slide of claim 1, wherein said second web segment comprises a sliding interconnection segment that is connected to said downstream end of said first web segment and an anti-slip segment that is connected to a downstream end of said sliding interconnection segment and that includes said downstream end of said second web segment, wherein said anti-slip segment includes said anti-slip upper surface area thereon, and wherein said sliding interconnection segment has a sliding surface with a coefficient of friction less than that of said anti-slip upper surface area.

6. The emergency evacuation slide of claim 5, wherein said sliding interconnection segment and said anti-slip segment each have a respective substantially fixed and non-elongatable size, and wherein said elastically elongatable first web segment has a defined resting length in a non-tensioned resting state and has an elastically elongated length of at least 150% of said defined resting length in a tensioned state in which said sliding interconnection segment applies a sliding tension to said elongatable first web segment.

7. The emergency evacuation slide of claim 5, comprising a plurality of said slide modules arranged on said slide support member.

8. The emergency evacuation slide of claim 7, wherein each said slide module further comprises a cover layer made of a material having a coefficient of friction sufficiently low for allowing sliding thereon, wherein said cover layer in each respective one of said slide modules covers at least said first web segment and exposes at least said anti-slip segment of said respective slide module in a non-operating resting state of said slide, and wherein said slide modules are so arranged that said anti-slip segment of said respective slide module extends at least partially over said cover layer of another one of said slide modules that is downstream adjacent said respective slide module during sliding of the person down said slide.

9. The emergency evacuation slide of claim 8, wherein said downstream end of said anti-slip segment of said respective slide module is secured to said cover layer of said another one of said slide modules, and said cover layer of said another one of said slide modules is secured to said slide support member, to provide said mechanical securing of said downstream end of said second web segment relative to said slide support member.

10. The emergency evacuation slide of claim 9, wherein said downstream end of said anti-slip segment of said respective slide module is rolled under a remaining portion of said anti-slip segment of said respective slide module such that said anti-slip upper surface area of said downstream end of said anti-slip segment of said respective slide module that is secured to said cover layer of said another one of said slide modules faces and contacts an upper surface of said cover layer of said another one of said slide modules.

11. The emergency evacuation slide of claim 1, wherein said slide support member comprises a gas-filled inflatable support tube.

12. The emergency evacuation slide of claim 11, further comprising an intermediate sheet layer arranged between said support tube and said at least one slide module.

13. The emergency evacuation slide of claim 12, wherein said downstream end of said second web segment is rolled under a remaining portion of said second web segment such that said anti-slip upper surface area of said downstream end of said second web segment faces and is secured to an upper surface of said intermediate sheet layer.

14. The emergency evacuation slide of claim 11, wherein said downstream end of said second web segment is rolled under a remaining portion of said second web segment such that said anti-slip upper surface area of said downstream end of said second web segment faces and is secured to an upper surface of said support tube.

15. The emergency evacuation slide of claim 1, comprising a plurality of said slide modules arranged on said slide support member in an arrangement selected from the group consisting of a first arrangement of said slide modules in a row, a second arrangement of said slide modules in a group, and a third arrangement of said slide modules arranged individually.

16. The emergency evacuation slide of claim 15, wherein said slide modules are arranged partially overlapping one another in a row.

17. The emergency evacuation slide of claim 1, wherein said downstream end of said second web segment is curled back underneath said second remaining portion of said second web segment.

18. The emergency evacuation slide of claim 1, wherein said anti-slip upper surface area of said second web segment has a coefficient of friction greater than 0.8, and said defined coefficient of friction of said frictional lower surface area of said second web segment is in a range from 0.05 to 0.5.

19. A combination of an aircraft having an exit door, and an emergency evacuation slide for a person to slide down from an upstream end of said slide at a higher elevation to a downstream end of said slide at a lower elevation, wherein:

said upstream end of said slide is connected to said aircraft at said exit door, said emergency evacuation slide comprises a slide support member and at least one slide module arranged on said slide support member, each said slide module comprises an elastically elongatable first web segment and a second web segment connected to a downstream end of said first web segment, said second web segment comprises an anti-slip upper surface area and a frictional lower surface area with a defined coefficient of friction, an upstream end of said first web segment is fixedly mechanically secured relative to said slide support member, a downstream end of said second web segment is fixedly mechanically secured relative to said slide support member, and a first remaining portion of said first web segment other than said upstream end of said first web segment and a second remaining portion of said second web segment other than said downstream end of said second web segment are not secured and are left loosely movable relative to said slide support member.

20. A method of using the emergency evacuation slide according to claim 1, to slide a person down from the upstream end of the slide to the downstream end of the slide, wherein the method comprises:

a) contacting the person on the anti-slip upper surface area as the person slides down the slide and thereby causing the second web segment to move downstream from an initial position along with the person, b) elastically stretching the first web segment as the second web segment moves downstream, c) releasing the person from the anti-slip upper surface area, and d) elastically retracting the first web segment and thereby moving the second web segment upstream back into the initial position.

21. The method of claim 20, further comprising frictionally sliding the frictional lower surface area against at least one component selected from the group consisting of the frictional lower surface area and a counter-surface, and thereby dissipating energy by frictional heating as the second web segment moves downstream, and further comprising dissipating energy by frictional heating caused by internal friction within the first web segment during said stretching and said retracting of the first web segment.

22. The method of claim 21, further comprising curling the downstream end of the second web segment underneath the second remaining portion of the second web segment, such that the frictional lower surface area is caused to curl back upon itself and frictionally slide against itself as the second web segment moves downstream.

23. An emergency evacuation slide for a person to slide down from an upstream end of said slide at a higher elevation to a downstream end of said slide at a lower elevation, wherein:

said slide comprises a slide support member and at least one slide module arranged on said slide support member, each said slide module comprises an elastically elongatable first web segment and a second web segment connected to a downstream end of said first web segment, said second web segment comprises an anti-slip upper surface area and a frictional lower surface area with a defined coefficient of friction, an upstream end of said first web segment is mechanically secured relative to said slide support member, a downstream end of said second web segment is mechanically secured relative to said slide support member, said second web segment comprises a sliding interconnection segment that is connected to said downstream end of said first web segment and an anti-slip segment that is connected to a downstream end of said sliding interconnection segment and that includes said downstream end of said second web segment, said anti-slip segment includes said anti-slip upper surface area thereon, and said sliding interconnection segment has a sliding surface with a coefficient of friction less than that of said anti-slip upper surface area.

24. The emergency evacuation slide of claim 23, wherein said sliding interconnection segment and said anti-slip segment each have a respective substantially fixed and non-elongatable size, and wherein said elastically elongatable first web segment has a defined resting length in a non-tensioned resting state and has an elastically elongated length of at least 150% of said defined resting length in a tensioned state in which said sliding interconnection segment applies a sliding tension to said elongatable first web segment.

* * * * *